United States Patent Office 3,275,599
Patented Sept. 27, 1966

3,275,599
RESINOUS COMPOSITION AND PROCESS FOR PREPARING THE SAME
John C. Petropoulos, Norwalk, Conn., and Ignazio S. Megna, Bronx, N.Y., assignors to American Cyanamid Company, New York, N.Y., a corporation of Maine
No Drawing. Filed June 28, 1961, Ser. No. 120,168
2 Claims. (Cl. 260—47)

This invention relates to a novel class of reaction products resulting from the reaction of a compound containing one or more epoxide groupings with a cyclopentanetetracarboxylic acid or its monoanhydride or its dianhydride. Still further this invention relates to the resinous reaction products of a compound containing a plurality of epoxide groupings reacted with a cyclopentanetetracarboxylic acid, its monoanhydride or its dianhydride.

One of the objects of the present invention is to produce a novel class of compounds resulting from the interreaction of a compound containing at least one epoxide group with a cyclopentanetetracarboxylic acid or its monoanhydride or its dianhydride. A further object of the present invention is to produce a novel class of compounds which have utility in a plurality of fields in the polymer arts including coatings, laminating, molding and bonding resins among others. These and other objects of the present invention will be discussed in greater detail hereinbelow.

The carboxylic acid component used in the preparation of the novel reaction products of the present invention is cyclopentane,1,2,3,4 tetracarboxylic acid or the monoanhydride of the cyclopentanetetracarboxylic acid or the dianhydride of the cyclopentanetetracarboxylic acid. These tetracarboxylic acids are available in a plurality of configurations. For instance one may have a cis,cis,-trans,cis-tetracarboxylic acid or a cis,cis,cis,cis-tetracarboxylic acid or a cis,trans,trans,cis-tetracarboxyilc acid and the like. The configuration of the monoanhydride of the cyclopentanetetracarboxylic acid requires that the adjacent carboxyl groups that have been dehydrated so as to form the anhydride must be cis to one another while the remaining undehydrated carboxyl groups may be either cis or trans to one another or cis or trans to the monoanhydride grouping. In the dianhydride of the cyclopentantetetracarboxylic acid each of the pairs of the carboxyl groups that are dehydrated to form the anhydride groupings must be cis to one another although the two anhydride groupings may be either cis or trans to one another. The 1,2,3,4-cyclopentanetetracarboxylic acid (cis,cis,cis,cis) is a colorless crystalline solid which is not very soluble in most organic solvents and has a melting point of 196° C. and a molecular weight of 246. The 1,2,3,4-cyclopentanetetracarboxylic acid (cis,cis,cis,cis) is prepared in a 60% yield by the nitric acid oxidation on endo-cis-bicyclo[2,2,1]-5-heptene-2,3-dicarboxylic anhydride at 60° C. The 1,2,3,4-cyclopentanetetracarboxylic acid-1,2,3,4-dianhydride is a colorless crystalline solid that is soluble in acetonitrile, ethanol and acetone. This dianhydride has a melting point of 222° C. and a molecular weight of 210. The dianhydride is prepared in quantative yields from the tetracarboxylic acid using acetic anhydride or acetyl chloride. The preparation of the endo-cis-bicyclo[2,2,1]-5-heptene-2,3-dicarboxylic anhydride is well known in the art and is accomplished by reacting cyclopentadiene with maleic anhydride.

The second component used in the preparation of the novel reaction products of the present invention are compounds that contain at least one epoxide group and preferable those which contain two or more epoxide groupings. These compounds may be aliphatic or aromatic and may be either simple compounds or resinous reaction products containing one or more epoxide groupings in the resin molecule. Illustrative of the latter type of resinous materials are those prepared by reacting epichlorohydrin with the isopropylidene p,p'-diphenol. Additionally one may use such epoxy compounds as 3,4-epoxy-6-methylcyclohexylmethyl-3,4-epoxy-6-methylcyclohexane carboxylate, dipentenedioxide, dipentenemonoxide, dicyclopentadienedioxide, vinyl cyclohexenediepoxide, 1,2-epoxyhexadecane, diepoxybutane, 3,4-epoxybutene-1,2,3,epoxy-2,4,4-methylpentane, glycidyl acrylate, glycidyl methacrylate, diglycidyl ether, diglycidyl ether of ethylene glycol, styrene oxide, 1,2-epoxy-3-phenoxy propane, 2,2-bis[3(2,3-epoxypropoxy)-p-tolyl] butane and the like. Additional epoxy compounds are disclosed in the following U.S. Patents 2,604,463; 2,590,059; 2,564,194; 2,794,029; 2,716,123; 2,779,771; 2,801,987; and 2,811,505. The disclosures of the epoxy compounds contained in the above cited references are incorporated herein by reference.

Theoretically, one epoxide group of an epoxy compound will react with one carboxylic group in the tetracarboxylic acid or anhydride. Therefore theoretically one would need to use four epoxy groups either in a single compound or in four monoepoxy compounds in order to react fully with the four carboxyl groups in the acid. In the practice of the process of the present invention one may use less than the theoretical amount of epoxy compound calculated to react fully with the tetracarboxylic acid or one can use more than the theoretical amount. One can use therefore 30% of theoretical, 55% of theoretical, 100% of theoretical or as much as 150% of theoretical. Even when monoepoxy compounds are used in the process of the present invention there results a cross-linked thermosetting polymeric material. When polyepoxy compounds are used there results a more highly cross-linked thermoset material. The products of the present invention are not necessarily resinous in character although without question they will be of comparatively high molecular weight in view of the molecular weight of the cyclopentanetetracarboxylic acid itself. Such materials could be used readily as a curing agent for epoxy resins of which latter resins a plurality are commercially available on the market. When these tetracarboxylic acids or their mono or dianhydrides or their low molecular weight reaction products with a monoepoxy compound are used as curing agents for epoxy resins there results a product having better rigidity and better thermal stability than conventional aromatic acids that have frequently been used for this curing agent purpose.

In the practice of the process of the present invention one may use temperatures varying between about 130° C. and 180° C. Temperatures below 130° C. may be used such as 80° C.–100° C. but the reaction proceeds rather slowly at these lower temperatures and as a consequence for commercial practicalities the preferred temperature range should be used. Temperatures in excess of 180° C. such as 190–250° C. may be used. The process of the present invention is ordinarily carried out at atmospheric pressure although subatmospheric and superatmospheric pressures may be used whenever desirable.

In carrying out the process of the present invention no solvent is required when the two reactants are each normally solid materials. It is particularly true that a solvent is unnecessary when the epoxy compound is a normally liquid material in which the tetracarboxylic acid is soluble. However, when the two reactants are each normally solid an intimate eutectic mixture of the solid materials can be prepared and the reaction carried out by fusion of the materials. In certain instances, a solvent for the reactants is desirable. When selecting a solvent for the reactants one should choose an inert organic solvent. Among the solvents which may be used in the practice of the process of the present invention are methylethyl ketone, acetone, acetate ester of monoethyl ether of ethylene glycol, methylisobutyl ketone and the like. Ordinarily water should not be used as the solvent in most reactions particularly when the monoanhydride or the dianhydride is to be used inasmuch as the presence of the water will convert these anhydrides to the tetracarboxylic acid. A further reason for avoiding the use of water as a solvent resides in the fact that it may tend to set up a reversible reaction and therefore prevent the reaction from going to completion. In this sense the water could be classed as a reactive solvent rather than an inert solvent and should for that additional reason be avoided.

In order that the concept of the present invention may be more completely understood the following examples are set forth in which all parts are parts by weight unless otherwise indicated. These examples are set forth primarily for the purpose of illustration and any specific enumeration of detail contained therein should not be interpreted as a limitation on the case except as is indicated by the appended claims.

EXAMPLE 1

Into a suitable reaction vessel equipped with stirrer and thermometer there is introduced 34.7 parts of the 1,2,3,4-cyclopentanetetracarboxylic acid dianhydride and 113 parts of a commercially available epoxy resin prepared by reacting epichlorohydrin with isopropylidene-p,p'-diphenol (bis-phenol A) having an epoxide equivalent of 190–210. The two reactants are finely divided and are intimately mixed with one another and gradually heated to about 160° C. when a clear, free-flowing melt is obtained. The melt is then poured into a pre-warmed mold and cured at 150° C. for 15 hours and at 220° C. for 7 hours. The resultant castings are subjected to a plurality of tests and compared with analogous castings in which the cyclopentanetetracarboxylic acid dianhydride was replaced with an equivalent amount of pyromellitic dianhydride and prepared in substantially the same manner. The results of the tests set forth hereinbelow show that the dianhydride of the cyclopentanetetracarboxylic acid gives castings which are comparable in strength properties to those reported for pyromellitic dianhydride and considerably better in thermal resistance as measured by loss in weight after 200 hours' exposure at 260° C. The results are shown in Table I.

TABLE I

| Properties | CPDA | PDA |
|---|---|---|
| Deflection Temperature, ° C | 230° C. | 285° C. |
| Flexural Strength, p.s.i. at 23° C | 10,200 | 8,600 |
| Flexural Strength, p.s.i. at 260° C | 2,000 | 2,000 |
| Flexural Modulus, p.s.i. at 10⁻⁶ at 23° C | 0.48 | 0.38 |
| Flexural Modulus, p.s.i. at 10⁻⁶ at 260° C | 0.12 | 0.12 |
| After 200 hours exposure at 260° C.: | | |
| Flexural Strength, p.s.i. at 260° C | 1,000 | |
| Flexural Modulus, p.s.i. at 10⁻⁶ at 260° C | 0.20 | |
| Percent Weight loss | 7.9 | 19.0 |
| Percent Weight loss after 500 hours | 14.5 | |

EXAMPLE 2

A mixture of 20 parts of cyclopentanetetracarboxylic acid dianhydride, 28 parts of phthalic anhydride and 100 parts of the commercially available epoxy resin used in Example 1 are intimately mixed as before and heat treated in the same manner as in Example 1 to form castings. The castings produced were subjected to a plurality of strength tests and compared with analogous castings which were substantially identical except that in the place of the cyclopentanetetracarboxylic acid dianhydride there is substituted an equivalent amount of pyromellitic dianhydride. The results of the tests are set forth in Table II.

TABLE II

| Properties | CPDA-PAA | PDA-PAA |
|---|---|---|
| Deflection Temperature, ° C | 178 | 207 |
| Flexural Strength, p.s.i. at 23° C | 15,300 | 13,000 |
| Flexural Modulus, p.s.i.×10⁻⁶ at 23° C | 0.54 | 0.53 |
| Flexural Strength, p.s.i.×150° C | 8,100 | 9,000 |
| Flexural Modulus, p.s.i.×10⁻⁶ at 150° C | 0.23 | 0.34 |

EXAMPLE 3

*Process for preparation of the monoanhydride of cyclopentanetetracarboxylic acid*

Into a suitable reaction vessel equipped with thermometer, stirrer, gas inlet and outlet tubes there is introduced 369 parts of cis,cis,cis,cis-1,2,3,4-cyclopentanetetracarboxylic acid. The charge is heated under a blanket of nitrogen with constant stirring at a temperature of about 220–260° C. for about 4 to 5 hours. The water which is formed during the reaction is collected in a water trap fitted to the condenser. One mol of water (27 parts) is formed per mol of the cyclopentanetetracarboxylic acid. A light brown glass is obtained which softens at 50–70° C. This material is soluble in acetone and methylethyl ketone. The infra-red spectrum analysis shows strong anhydride as well as carboxyl absorption and as a consequence it must be concluded that the major product is the monoanhydride dicarboxylic acid. A titration analysis of the product showed the following:

| Run | Anhydride, meq./g.* | —COOH, meq./g. | —COOH, meq./g. | Total, Meq./g. | Percent Theory |
|---|---|---|---|---|---|
| 1 | 3.79 | 4.84 | 4.47 | 13.10 | 99.5 |
| 2 | 3.76 | 4.98 | 4.38 | 13.17 | 99.7 |

*Milli-equivalents/gram.

EXAMPLE 4

21.2 parts of the monoanhydride of cyclopentanetetracarboxylic acid and 50 parts of the epoxy resinous material used in Example 1 are blended together and heated to 80–120° C. The light brown mobile resin is poured into a mold and is cured at 150° C. for 15 hours and post-cured at 220° C. for 24 hours. A hard, clear casting is obtained having a heat distortion temperature >250° C. Analogous castings made from phthalic anhydride have a heat distortion temperature about 130° C.

EXAMPLE 5

210 parts of cyclopentanetetracarboxylic acid dianhydride and 100 parts of epichlorohydrin are blended together in a suitable reaction vessel and the mixture heated at 110–210° C. for about 15 minutes with about 5 parts of triethylamine. The mixture gradually becomes clear and more viscous and finally gels to a colorless, infusible mass.

EXAMPLE 6

248 parts of cyclopentanetetracarboxylic acid and 500 parts of a commercially available epoxy resin having an epoxide equivalent of 450–525 are blended together and heated in a suitable reaction vessel at 170–190° C. The mixture gels within 5 minutes to a white, rigid foamed material which is infusible.

EXAMPLE 7

114 parts of cyclopentanetetracarboxylic acid monoanhydride and 232 parts of a commercially available epoxy resin having an epoxide equivalent of 232 are blended together in a suitable reaction vessel and heated at a temperature of 120–130° C. The reaction product gels to an infusible mass. The commercially available epoxy resin used hereinabove is an epoxidized polybutadiene.

EXAMPLE 8

Into a suitable reaction vessel there is introduced 105 parts of the cyclopentanetetracarboxylic acid dianhydride and 133 parts of a commercially available epoxy resin product by reacting butane-diol-1,4 and epichlorohydrin having an epoxide equivalent of 135. The blend is heated at 170°–190° C. until the mass gels to a hard infusible mass.

EXAMPLE 9

Into a suitable reaction vessel there is introduced 366 parts of 3,4-epoxy-6-methylcyclohexylmethyl 3,4-epoxy-6-methylcyclohexane carboxylate and 228 parts of cyclopentanetetracarboxylic acid monoanhydride and 100 parts of methylisobutyl ketone. The materials are blended together and heated at 75–100° C. until a clear liquid forms.

EXAMPLE 10

Into a suitable reaction vessel there is introduced 9 parts of cyclopentanetetracarboxylic acid monoanhydride and 20 parts of the epoxy resin used in Example 1, and 8 parts of methylethyl ketone. The materials are blended together with slight warming to give a viscous liquid. Films from this liquid are drawn down on glass and baked at a temperature of 150° C. for 30 minutes. The resulting films are very hard, tough, clear, craterless and possessed high gloss.

In the reaction of the cyclopentanetetracarboxylic acid compounds and particularly the dianhydride with a compound having at least one epoxide group, it is frequently desirable to make use of catalytic amounts of an alkaline curing agent such as an amine and preferably a tertiary amine. Among the curing agents which may be used in the practice of the process of the present invention are trimethylamine, triethylamine, tripropylamine, tributylamine, dimethylethylamine, dimethylpropyl amine, dimethylbutylamine or the alkyl alkylol amine such as ethyl dimethylolamine, dipropyl methylolamine. The amounts of these curing agents may be varied from about 0.01% to 10% by weight and preferably between about 0.1% and 2% by weight based on the total weight of reactants used.

The composition of the present invention may be further modified by incorporating therein other organic acids and/or their anhydrides when and as available. Preferably these acids should be at least dicarboxylic in order to aid in the production of resinous materials. Among the acids which may be used are those which are free of nonbenzenoid unsaturation such as phthalic, oxalic, malonic, succinic, glutaric, sebacic, adipic, pimelic, suberic, azelaic, tricarballylic, citric, tartaric, malic and the like. Additionally one may make use of the alpha, beta-ethylenically unsaturated dicarboxylic acids such as maleic, fumaric, aconitic, itaconic and the like. These acids, and/or their anhydrides may be used either singly or in combination with one another. The amount of cyclopentanetetracarboxylic acid compound used must be at least 20 mol percent and preferably 50 mol percent based on the total number of mols of acid compound used in the reaction mixture. It is obvious that one could use the cyclopentanetetracarboxylic acid compound to the exclusion of any other acidic material. If monocarboxylic acids are used, the amount of such acid should not exceed about 10–20 mol percent based on the total mols of acidic material used inasmuch as these monocarboxylic acids function as chain terminators and as a consequence would limit the size of the resinous molecule.

In addition to the fields of use of the compositions of the present invention set forth hereinabove, these compositions will be useful in such areas as adhesives, coatings, potting compounds and the like.

When the monoanhydride of the cyclopentanetetracarboxylic acid, prepared according to the thermal dehydration process of Example 3, is exposed to elevated temperatures such as between about 200 and 245° C., it does not decompose whereas the dianhydride of the cyclopentanetetracarboxylic acid when subjected to the same elevated temperatures does lose water and additionally about 1 mole of carbon dioxide per mole of dianhydride to give a product of unknown composition. It is theorized that the dianhydride undergoes substantial degradation at these elevated temperatures. This fact is depicted in the systems in which the monoanhydride and the dianhydride are separately reacted with an epoxy resin such as the epoxy resin used in Example 1. The monoanhydride does not give off any volatiles during cure at 160–200° C. whereas the dianhydride at these elevated temperatures does give off volatiles which produces bubbles in the cast product, in varying degrees, and in some instances approaches a foam. The cyclopentanetetracarboxylic acid per se also forms foams in a casting at temperatures in this order of magnitude as is shown in Example 6. The foaming of the product in Example 6, however, is believed to be due to the liberation of water of dehydration and/or water of esterification but the tetracarboxylic acid per se did not undergo decomposition as no carbon dioxide was given off. As a consequence, if a foamed material is desired, the cyclopentanetetracarboxylic acid or the dianhydride of the cyclopentanetetracarboxylic acid should be used at these elevated temperatures whereas if solid castings that are devoid of bubbles and foamed characteristics are desired, the monoanhydride of the cyclopentanetetracarboxylic acid should be used at these elevated temperatures. If lower temperatures are used, which necessitate longer curing times, all three of these acid compounds may be used separately or in combination with one another.

The configuration of the monoanhydride product according to Example 3 indicates that the undehydrated carboxyl groups are trans to each other as the titration peaks at the end of Example 3 indicate. It is to be noticed that in Example 3 the starting material was cis,cis,cis,cis-1,2,3,4-cyclopentanetetracarboxylic acid. The dehydration produces the monoanhydride as is evidenced by the liberation of but one mole of water and by the titration peaks. Since the titration analysis shows different peaks for the two carboxyl groups, it is theorized that one of the undehydrated carboxyl groups has undergone isomerization resulting in a trans configuration of the remaining pair of undehydrated carboxyl groups.

The monoanhydride of the cyclopentanetetracarboxylic acid prepared according to Example 3 appears to be amorphous in nature, or if crystalline, it crystalizes at an extremely slow rate. The monoanhydride is further believed to be truly amorphous because of the way it dissolves so readily in appropriate solvents as contrasted with the slow dissolution rate of the crystalline counterpart, i.e., the dianhydride of the tetracarboxylic acid or the tetracarboxylic acid per se. This solubility characteristic of the monoanhydride makes it a far more advantageous material to use than the tetracarboxylic acid per se and the dianhydride thereof because the latter materials must be heated to elevated temperatures in order to achieve solution in the epoxy material which results in the production of hard but foamed materials. The monoanhydride on the other hand will be dissolved readily at intermediate temperatures such as 80–120° C. to form a mobile free flowing fluid which has much longer pot life and on ultimate cure displays no bubbles or foamed characteristics in the ultimate cast article.

We claim:
1. A heat reaction product of a compound containing at least one epoxide group and the glassy monoanhydride of 1,2,3,4-cyclopentanetetracarboxylic acid composition which softens at a temperature between about 50° C. and 70° C., wherein the oxygen of said epoxide group is attached to vicinal carbon atoms wherein the amount of the epoxy compound used may be varied between about 30% and 150% of the theoretical amount calculated to react fully with the said acid-monoanhydride composition.

2. A heat reaction product of a polyepoxide compound with the glassy monoanhydride of 1,2,3,4-cyclopentanetetracarboxylic acid composition which softens at a temperature between about 50° C. and 70° C., wherein the oxygen of said epoxide group is attached to vicinal atoms wherein the amount of the epoxy compound used may be varied between about 30% and 150% of the theoretical amount calculated to react fully with the said acid-monoanhydride composition.

References Cited by the Examiner
UNITED STATES PATENTS

| | | | |
|---|---|---|---|
| 2,768,153 | 10/1956 | Shokal | 260—47 |
| 2,935,488 | 5/1960 | Phillips et al. | 260—47 |
| 2,965,610 | 12/1960 | Newey | 260—47 |
| 3,102,872 | 9/1963 | Carlson et al. | 260—47 |

OTHER REFERENCES

Grant: "Hackh's Chemical Dictionary," 3rd ed., McGraw-Hill Book Co., Inc., 1944, page 310 relied on.

Charlton: "Modern Plastics," vol. 32, No. 1, September 1954, pages 155–61 and 240–243.

SAMUEL H. BLECH, *Primary Examiner.*

LOUISE P. QUAST, HAROLD N. BURSTEIN, WILLIAM H. SHORT, *Examiners.*

T. D. KERWIN, A. LIBERMAN, P. H. HELLER, *Assistant Examiners.*